United States Patent
Cole et al.

(10) Patent No.: US 10,855,326 B1
(45) Date of Patent: Dec. 1, 2020

(54) REDUCED COMPLEXITY IN GENERATING CHAOTIC SEQUENCES FOR COMMUNICATION SYSTEMS USING SUB-SAMPLING TECHNIQUES

(71) Applicant: NORTHROP GRUMMAN SYSTEMS CORPORATION, Falls Church, VA (US)

(72) Inventors: Ryan K. Cole, Hermosa Beach, CA (US); Christopher W. Walker, Rancho Palos Verdes, CA (US); Ameesh N. Pandya, Los Angeles, CA (US); Yen M. Hoang, Anaheim, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/854,980

(22) Filed: Apr. 22, 2020

(51) Int. Cl.
  *H04B 1/707* (2011.01)
  *H04B 7/06* (2006.01)
  *H04L 27/26* (2006.01)
  *H04L 27/00* (2006.01)

(52) U.S. Cl.
  CPC .......... *H04B 1/707* (2013.01); *H04B 7/0671* (2013.01); *H04L 27/001* (2013.01); *H04L 27/2602* (2013.01)

(58) Field of Classification Search
  CPC ... H04B 1/707; H04B 7/0671; H04L 27/2602; H04L 27/001
  See application file for complete search history.

(56) References Cited

U.S. PATENT DOCUMENTS

| | | | |
|---|---|---|---|
| 10,447,339 B2 * | 10/2019 | Michaels | H04L 27/2092 |
| 2002/0154677 A1 * | 10/2002 | Occhipinti | H04L 27/001 375/130 |
| 2017/0163296 A1 * | 6/2017 | Terry | H04B 7/00 |

OTHER PUBLICATIONS

Michaels. Alan J. Digital Chaotic Communications a Dissertation Presented to the Academic Faculty. Jul. 1, 2009 pp. 1-208 Georgia Institute of Technology. (Year: 2009).*

* cited by examiner

*Primary Examiner* — Nader Bolourchi
(74) *Attorney, Agent, or Firm* — John A. Miller; Shumaker, Loop, Kendrick, LLP

(57) ABSTRACT

A sub-sampling system that is part of a modulator in a transmitter employing a chaos based architecture and including a symbol mapper and a chaos generator. The system includes M-number of channels each receiving a sequence of chaos samples from the generator and a delay device in all of the channels except one that delay the chaos samples at different delay times. The system also includes a sub-sampler in all of the channels that receive the delayed samples, where each sub-sampler outputs every predetermined one of the chaos samples and a register in each channel each storing a predetermined number of the sub-sampled chaos samples. A selection switch responsive to the stored sub-sampled chaos samples from the registers, where the selection switch is responsive to a selection signal from the symbol mapper that selects one of the registers to output the sequences of stored sub-sampled chaos samples from the system.

19 Claims, 1 Drawing Sheet

REDUCED COMPLEXITY IN GENERATING CHAOTIC SEQUENCES FOR COMMUNICATION SYSTEMS USING SUB-SAMPLING TECHNIQUES

BACKGROUND

Field

This disclosure relates generally to a chaos sub-sampling system and, more particularly, to a chaos sub-sampling system that creates a plurality of uncorrelated sequences of chaos samples from a single sequence of chaos samples.

Discussion of the Related Art

Digital communications systems typically map or translate a stream of encoded information bits to be transmitted into a constellation of symbols, where each symbol defines a group of the bits. For example, a symbol mapper may employ M-ary phase shift keying (M-PSK) that provides in-phase and quadrature-phase bits for each symbol that is transmitted. The mapped symbols are then modulated onto a waveform, filtered and converted to an analog signal for transmission. When the analog signal is received by a receiver, the signal is converted to a digital signal to remove the carrier and the digital signal is demodulated to recover the bit symbols, which requires knowledge of the time and position of the individual symbols in the signal to correctly determine the value of each symbol. The information bits are then extracted from the bit symbols.

For certain applications, it is desirable to transmit a data or communications signal without that signal being detected by someone else, such as an adversary, i.e., the adversary does not know that a signal is being transmitted, typically for various low probability of interception/low probability of detection (LPI/LPD) communications applications. One approach is to spread the energy of the transmitted signal, which would normally be transmitted over a relatively narrow frequency band, over a wide frequency band or spectrum, known in the art as direct-sequence spread-spectrum processing, so that the signal energy is washed out in the background and is not readily detectable. Conventionally, spread spectrum systems use a pseudo-noise (PN) sequence for spreading information bits in conjunction with traditional modulation techniques, such as M-PSK, M-ary quadrature amplitude modulation (M-QAM), etc., for the purposes of transmission. Although these techniques do bury the signal below the noise floor, they cannot hide the features that adversaries can detect. A sub-approach for spread-spectrum processing includes spreading the signal with a chaotic sequence to spread out the energy of the transmitted waveform. The modulation techniques employed for the chaotic spread signal is typically conventional modulation and coding, such as M-PSK, M-QAM, etc., which allows a straightforward synchronization between the modulated bits transmitted by the transmitter and the bits received by the receiver using conventional demodulation and decoding.

Alternately, non-conventional techniques such as M-ary chaotic shift keying (M-CSK) can be employed. Chaos communications systems employ modulators that often include multiple chaos generators that each generate a chaotic sequence of samples, where each sequence of samples is used to spread out one of symbols. Each of the generators has a different initial seeding that determines the chaotic sequence of the samples it generates, where the next value of one generator is often the first value of the next generator. These generators are only correlatable to themselves and look like white noise. It is desirable to reduce the complexity of these types of communications systems, and one way of doing that is to reduce the number of chaos generators that are required to provide the necessary chaotic sample sequences.

DETAILED DESCRIPTION OF THE EMBODIMENTS

The following discussion of the embodiments of the disclosure directed to a chaos sub-sampling system that creates a plurality of uncorrelated sequences of chaos samples from a single sequence of chaos samples is merely exemplary in nature, and is in no way intended to limit the disclosure or its applications or uses. For example, the chaos sub-sampling system is described in connection with a spread-spectrum communications system employing M-CSK chaotic symbol modulation. However, as will be appreciated by those skilled in the art, the chaos sub-sampling system will have other applications.

It has been determined through various practical tests for chaos systems that chaotic sequences can be down-sampled, i.e., sub-sampled sequences, in such a way that they keep their chaotic properties for the purposes of LPI/LPD communications. For example, noise-like featureless structure, strong autocorrelation, weak cross-correlation, etc. More specifically, a particular chaotic sequence can be sub-sampled or sub-sequenced, for example, 4-CSK, by taking every fourth sample of the sequence starting from the first sample, then taking every fourth sample starting from the second sample, and so on to generate four sequences that are chaotic and also do not have any cross-correlation between each other. Sub-sampling can achieved by down-sampling the chaos sequence into M symbols worth of sequences and placing them into memory arrays and sub-sequencing can be achieved by dividing up the chaos sequence into M symbols worth of smaller blocks and placing those into memory arrays. The chaotic sequence is transmitted by a selector that provides an output for one memory array per symbol period. Thus, instead of operating multiple chaos generators for the symbols, a single chaos generator can be employed to generate the several chaos sequences required for a particular number of M-CSK symbols, which saves on redundant hardware and higher processing power.

Figure 1:
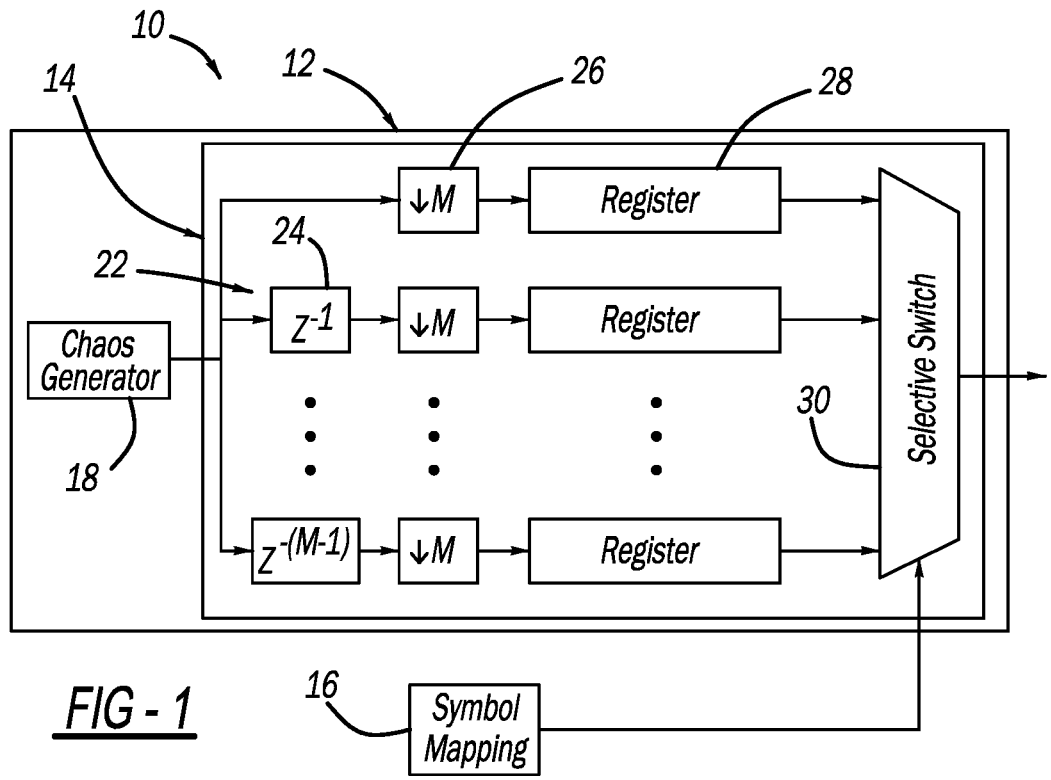
FIG. 1 is a schematic block diagram of a portion of a transmitter including an M-CSK modulator having a chaos sub-sampling system.

FIG. 1 is a schematic block diagram of a portion of a transmitter 10 that is part of, for example, a chaos spread-spectrum communications system. The transmitter 10 includes a chaos modulator 12 that may employ, for example, an M-CSK architecture, to represent symbols as a chaotic sequence of values that spreads the energy of the symbols across a wider spectrum to be below the noise floor, where m-bits per symbol mapping corresponds to the M-CSK, and where $M=2^m$ represents the number of the symbols, although other types of modulators can be employed consistent with the discussion herein. The transmitter 10 also includes a symbol mapper 16 that converts error coded information bits to M-CSK symbols for transmission in a manner well understood by those skilled in the art.

The modulator 12 includes a single pseudo-random number or chaos generator 18 that generates a stream of random numbers or chaos samples at a certain sample rate and that replaces the multiple chaos generators required for each transmitted symbol in the known modulators for these types of communications systems. The modulator 12 also includes a chaos sub-sampling system 14, where the chaos samples from the generator 18 are sub-sampled by the chaos sub-sampling system 14. The stream of chaos samples from the generator 18 is sent to a series of M number of channels 22 in the system 14 to provide the sub-sampling and produce multiple uncorrelated chaotic sample sequences, where the number channels 22 would be four for the 4-CSK example being discussed herein. The sub-sampling system 14 includes a series of M−1 delay devices 24, one for each channel 22 that receive the stream of chaos samples, except the first channel where the samples are not delayed, and where each delay device 24 delays outputting the received chaos samples an additional sample time going from a top one of channels 22 to a bottom one of the channels 22. The delayed stream of chaos samples in each channel 22 are then sent to a sub-sampler 26 that outputs every $M^{th}$ number chaos sample so that the output from the sub-samplers 26 for each sample time is different. The sub-samplers 26 can sub-sample all samples of the sequence of chaos samples at the same interval or at different intervals.

The chaos samples from the sub-samplers 26 in each channel 22 are sent to a register 28 that stores a number of the samples. In one embodiment, the registers 28 store the number of samples that equals a chaos spread factor for a certain spread-spectrum communications system, where the chaos spreading factor determines how much the symbols are spread out, i.e., the number of samples per symbol. Specifically, for a spreading factor of length L, a symbol is represented by L number of chaos bits or samples. In an alternate embodiment, the registers 28 hold one chaos sample such that the registers 28 may not be needed, where the particular channel 22 that is selected remains open until the desired number of samples for signal spreading is output from the modulator 12.

A selection switch 30 receives the chaos samples from each register 28 and an output from the symbol mapper 16 selects the output from one of the registers 28 in one of the channels 22 to be transmitted so that it appears that a different sequence of uncorrelated chaos samples is provided depending on which channel 22 is selected. When a particular register 28 is unloaded, then all of the other registers 28 are cleared and then reloaded for the next register 28 to be unloaded.

The chaotic modulated symbols are then sent to a digital-to-analog converter (DAC) (not shown) that modulates the digital signals onto an analog waveform for transmission. The analog signal is then filtered by an appropriate filter (not shown) and transmitted by an antenna (not shown).

Figure 2:
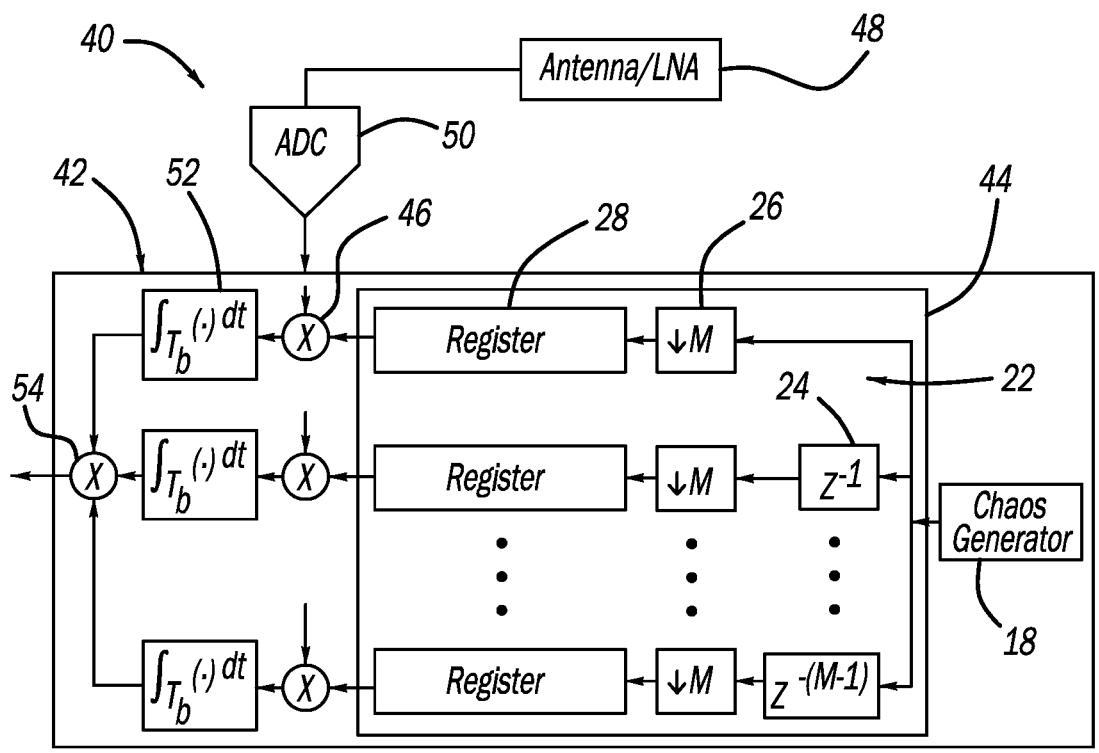
FIG. 2 is a schematic block diagram of a portion of a receiver including an M-CSK demodulator having a chaos sub-sampling system.

The same type of sub-sampling system is required in the receiver that receives the signal from the transmitter 10 to remove the chaotic sequence and decipher the information bits, where the receiver would also have a single chaos generator that is synchronized to the generator 18. FIG. 2 is a schematic block diagram of a portion of a receiver 40 including a demodulator 42 having a sub-sampling system 44 operating in the same manner as the sub-sampling system 14, where like elements are identified by the same reference number. Instead of one of the outputs from the registers 28 being selected at any particular sample point in time, the delayed chaotic sequence from each channel 22 is sent to a separate multiplier 46 along with a received signal from an antenna and low noise amplifier (LNA) 48 that has been converted to a digital signal by an analog-to-digital converter (ADC) 50. The multiplied signals are integrated by an integrator 52 in a known manner by a correlation process. The correlated samples from each of the integrators 52 are then added in a summer 54. A soft or hard decision processor (not shown) removes the bits from the symbols and a decoder (not shown) removes the redundant bits to provide the information bits using known processes from the literature.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A sub-sampling system comprising:
   a plurality of channels each receiving a sequence of chaos samples from a common chaos generator;
   a delay device in each channel of the plurality of channels that each delay the sequence of chaos samples at different delay times;
   a sub-sampler in each channel of the plurality of channels receiving the delayed sequence of chaos samples from the delay device, each sub-sampler outputting every predetermined number of the chaos samples so that each sub-sampler outputs a sequence of sub-sampled chaos samples that each have a different chaos sample at a certain sample time; and
   a selection switch responsive to all of the sequences of sub-sampled chaos samples from the sub-samplers, said selection switch also being responsive to a selection signal that selects one of the sequences of sub-sampled chaos samples to be output from the sub-sampling system.

2. The system according to claim 1 further comprising a register in each channel, each register storing a predetermined number of the sub-sampled chaos samples, said selection switch outputting all of the chaos samples from the register when a particular channel is selected.

3. The system according to claim 2 wherein each register holds a number of samples determined by a chaos spread factor.

4. The system according to claim 1 wherein the sub-samplers sub-sample every same number of chaos samples.

5. The system according to claim 1 wherein the system is part of a modulator.

6. The system according to claim 5 wherein the modulator employs an M-ary chaotic shift keying (M-CSK) architecture.

7. The system according to claim 6 wherein the M-CSK architecture is a 4-CSK architecture.

8. The system according to claim 6 wherein the number of channels is M number of channels.

9. The system according to claim 5 wherein the selection signal is provided by a symbol mapper.

10. A sub-sampling system that is part of a modulator in a transmitter employing an M-ary chaotic shift keying (M-CSK) architecture and including a symbol mapper and a single chaos generator, said system comprising:
    M-number of channels each receiving a sequence of chaos samples from the chaos generator;

a delay device in all of the channels except one that each delay the chaos samples at different delay times;

a sub-sampler in each channel of the M-number of channels receiving the sequence of delayed chaos samples, each sub-sampler outputting every predetermined number of the chaos samples so that each sub-sampler outputs a sequence of sub-sampled chaos samples that each have a different chaos sample at a certain sample time;

a register in each channel each storing a predetermined number of the sequence of sub-sampled chaos samples; and a selection switch responsive to the stored sub-sampled chaos samples from the registers, said selection switch also being responsive to a selection signal from the symbol mapper that selects one of the registers to output the sequences of stored sub-sampled chaos samples from the sub-sampling system.

11. The system according to claim 10 wherein each register holds a number of samples determined by a chaos spread factor.

12. The system according to claim 10 wherein the sub-samplers sub-sample every same number of chaos samples.

13. The system according to claim 10 wherein the M-CSK architecture is a 4-CSK architecture.

14. A communications system comprising:

a transmitter including a modulator that modulates a signal to be transmitted, said modulator including a transmitter chaos generator and a transmitter sub-sampling sub-system, said transmitter sub-sampling sub-system including a plurality of channels each receiving a sequence of chaos samples from the transmitter chaos generator, a delay device in each of the plurality of channels that each delay the sequence of chaos samples at different delay times, a sub-sampler in each channel of the plurality of channels receiving the delayed chaos samples, each sub-sampler outputting every predetermined number of the chaos samples so that each sub-sampler outputs a sequence of sub-sampled chaos samples that each have a different chaos sample at a certain sample time, and a selection switch responsive to all of the sequences of sub-sampled chaos samples from the sub-samplers in the channels, said selection switch also being responsive to a selection signal that selects one of the sequences of sub-sampled chaos samples to be transmitted by the transmitter; and a receiver receiving the transmitted signal and including a demodulator that demodulates the transmitted signal, said demodulator including a receiver chaos generator and a receiver sub-sampling sub-system, said receiver sub-sampling sub-system including a plurality of channels each receiving a sequence of chaos samples from the receiver chaos generator, a delay device in each of the plurality of channels that each delay the sequence of chaos samples at different delay times, a sub-sampler in each channel of the plurality of channels receiving the delayed chaos samples, each sub-sampler outputting every predetermined number of the chaos samples so that each sub-sampler outputs a sequence of sub-sampled chaos samples that each have a different chaos sample at a certain sample time, said demodulator further including a multiplier in each channel that multiplies the chaos samples by the transmitted signal, and an adder that adds the multiplied signal.

15. The system according to claim 14 wherein the transmitter sub-sampler sub-system further includes a register in each channel, each register storing a predetermined number of the sub-sampled chaos samples, said selection switch outputting all of the chaos samples from the register when a particular channel is selected.

16. The system according to claim 15 wherein each register holds a number of samples determined by a chaos spread factor.

17. The system according to claim 14 wherein the modulator employs an M-ary chaotic shift keying (M-CSK) architecture.

18. The system according to claim 17 wherein the number of channels is M number of channels.

19. The system according to claim 14 wherein the selection signal is provided by a symbol mapper.

* * * * *